(12) United States Patent
Wittkopp et al.

(10) Patent No.: US 8,460,142 B2
(45) Date of Patent: *Jun. 11, 2013

(54) ELECTRICALLY-VARIABLE TRANSMISSION

(75) Inventors: Scott H. Wittkopp, Ypsilanti, MI (US);
Alan G. Holmes, Clarkson, MI (US);
James M. Hart, Belleville, MI (US);
Edwin T. Grochowski, Howell, MI (US); Elizabeth I. Wooden, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 945 days.

This patent is subject to a terminal disclaimer.

(21) Appl. No.: 12/430,178

(22) Filed: Apr. 27, 2009

(65) Prior Publication Data

US 2010/0179009 A1 Jul. 15, 2010

Related U.S. Application Data

(60) Provisional application No. 61/144,567, filed on Jan. 14, 2009.

(51) Int. Cl.
*F16H 3/72* (2006.01)
*F16H 37/06* (2006.01)
*F16H 3/44* (2006.01)

(52) U.S. Cl.
USPC ................ 475/5; 475/271; 475/317

(58) Field of Classification Search
USPC ............................................. 475/5
See application file for complete search history.

(56) References Cited

U.S. PATENT DOCUMENTS

| 5,935,035 | A | * | 8/1999 | Schmidt ............................ 475/5 |
| 6,478,705 | B1 | | 11/2002 | Holmes et al. |
| 7,261,659 | B2 | | 8/2007 | Raghavan et al. |
| 8,152,669 | B2 | * | 4/2012 | Maguire et al. ................... 475/5 |
| 8,226,514 | B2 | * | 7/2012 | Grochowski et al. ............. 475/5 |
| 2006/0046886 | A1 | * | 3/2006 | Holmes et al. .................... 475/5 |

* cited by examiner

*Primary Examiner* — David D Le
*Assistant Examiner* — Colby M Hansen
(74) *Attorney, Agent, or Firm* — Quinn Law Group, PLLC

(57) ABSTRACT

Various embodiments of electrically-variable transmissions have first and second motor-generators, first and second planetary gear sets, and two torque-transmitting mechanisms, including a rotating-type torque-transmitting mechanism and a stationary-type torque-transmitting mechanism. An input member is connected for common rotation with a ring gear of the first planetary gear set. Carrier members of both of the planetary gear sets are connected for common rotation with one another, and with an output member, via one or more radial-extending hub members and an axial-extending member or shaft. The first motor/generator is connected for common rotation with the sun gear of the first planetary gear set. The second motor/generator is connected for common rotation with the sun gear member of the second planetary gear set. In each embodiment, the various components of the transmission are positioned relative to one another to minimize the number and/or size of interconnecting shafts and shells.

18 Claims, 7 Drawing Sheets

ELECTRICALLY-VARIABLE TRANSMISSION

CROSS-REFERENCE TO RELATED APPLICATIONS

This application claims the benefit of U.S. Provisional Application Ser. No. 61/144,567, filed Jan. 14, 2009, which is hereby incorporated by reference in its entirety.

TECHNICAL FIELD

The invention relates to an electrically-variable transmission having two motor-generators and two planetary gear sets.

BACKGROUND OF THE INVENTION

Electrically-variable transmissions typically have an input member, an output member, and two electric motor/generators connected to different members of planetary gear sets. Clutches allow one or more electrically-variable modes of operation, fixed speed ratio modes, and an electric-only (battery-powered) mode. Electrically-variable transmissions may improve vehicle fuel economy in a variety of ways, primarily by using one or both of the motor/generators for vehicle braking and using the regenerated energy to power the vehicle electrically, with the engine off. The engine may be turned off at idle, during periods of deceleration and braking, and during periods of low speed or light load operation to eliminate efficiency losses due to engine drag. Braking energy captured via regenerative braking (or electrical energy generated during periods when the engine is operating) is utilized during these engine-off periods. Transient demand for engine torque or power is supplemented by the motor/generators during operation in engine-on modes, allowing for a smaller engine without reducing vehicle performance. Additionally, the electrically-variable modes may allow the engine to be operated at or near the optimal efficiency point for a given power demand.

It is challenging to package the two motor/generators, planetary gear sets, and multiple torque-transmitting mechanisms necessary to achieve the desired modes of operation, while meeting other applicable dimensional limitations and achieving relatively simple assembly requirements. Furthermore, although electrically variable transmissions are being mass-produced today, they are installed in only a very small fraction of the total number of vehicles produced today, and so engineering and tooling costs are much more important as compared with those costs for other types of transmissions.

SUMMARY OF THE INVENTION

Various embodiments of electrically-variable transmissions are provided that have a first and a second motor/generator, a first and a second planetary gear set, and two torque-transmitting mechanisms, including a rotating-type clutch and a stationary-type clutch. The first torque-transmitting mechanism is selectively engagable to ground the ring gear of the second planetary gear set to the stationary member. The second torque-transmitting mechanism is selectively engagable to connect the sun gear of the first planetary gear set for common rotation with the ring gear of the second planetary gear set. An input member is connected for common rotation with a ring gear of the first planetary gear set. Carrier members of both of the planetary gear sets are connected for common rotation with one another, and with an output member, via one or more radial-extending hub members and axial-extending members or shafts. The rotor of the first motor/generator is connected for common rotation with the sun gear of the first planetary gear set. The rotor of the second motor/generator is connected for common rotation with the sun gear of the second planetary gear set. In each embodiment, the various components of the transmission are positioned relative to one another to minimize the number and/or size of interconnecting, axially-extending shafts and shells (i.e., axial-extending members spaced from the axis of rotation by radial-extending hub members and passing over (enveloping) other rotatable components). For example, the input member is radially surrounded by at least one of the planetary gear sets, and/or the first torque-transmitting mechanism is radially outward of and aligned with the second planetary gear set, and/or the output member extends radially from one of the planetary gear sets. Thus, spin losses and costs are reduced. Assembly may also be simplified.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
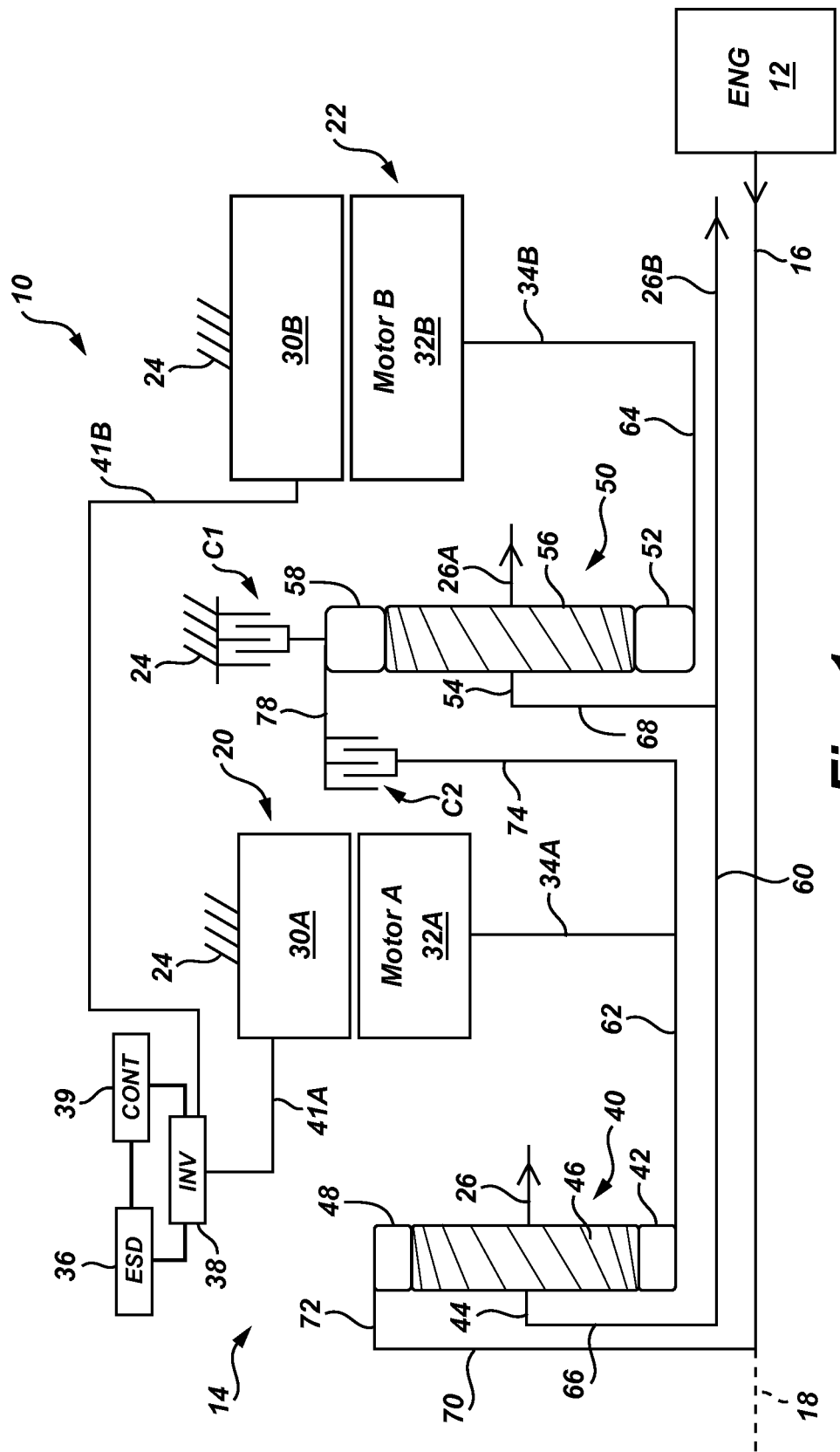
FIG. 1 is a schematic illustration of a first embodiment of a hybrid electric powertrain including a first embodiment of an electrically variable transmission.

Referring to the drawings wherein like reference numbers refer to like components, FIG. 1 shows a powertrain 10 having engine 12 drivingly connected with an electrically variable transmission 14. An output member of the engine 12 is connected for driving an input member 16 of the transmission 14. The input member 16 rotates about and establishes an axis of rotation 18.

A first motor/generator 20, and a second motor/generator 22 are packaged within a transmission casing 24 and are operatively connected between the input member 16 and a transmission output member 26 connected with a final drive (not shown). The transmission casing 24 is shown only in part, and is generally annular, surrounding the entire transmission 14, with end walls closing off the axial ends and having access openings for the input member 16 and the output member 26, 26A or 26B to extend therethrough. As discussed below, alternate locations serving as alternate transmission output members 26A, 26B are also provided. All of the potential output members 26, 26A, 26B are interconnected to rotate commonly (i.e., at the same speed). Any one, but only one, of the transmission output members 26, 26A and 26B may be connected with the final drive; the selection of which output location will serve as the output member connected with the final drive will depend on packaging requirements of the powertrain 10 within the vehicle.

The first motor/generator 20 includes an annular stator 30A grounded to the transmission casing 24, an annular rotor 32A supported on and for rotation with a rotatable rotor hub 34A and concentric about the axis of rotation 18. A battery 36, power inverter 38 and electronic controller 39 are operatively connected with the stator 30A via transfer conductor 41A to control the functioning of the motor/generator 20A as a motor, in which stored electrical power is provided by the battery 36 to the stator 30A, and a generator, in which torque of the rotating rotor 32A is converted to electrical power stored in the battery 36. The ability to control a motor/generator to function as a motor or as a generator is well known.

Similarly, the second motor/generator 22 includes an annular stator 30B grounded to the transmission casing 24, an annular rotor 32B supported on a rotatable rotor hub 34B and concentric about the axis of rotation 18. The battery 36, power inverter 38 and electronic controller 39 are operatively connected with the stator 30B via transfer conductor 41B to control the functioning of the motor/generator 20B as a motor and a generator.

The transmission 14 further includes first and second planetary gear sets 40, 50. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46. An alternative output member 26 may be connected to carrier member 44 for rotation therewith.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. An alternate output member 26A may be connected with the carrier member 54 for rotation therewith. Rotor hub 34B is connected for rotation with the sun gear 52 by intermediate sleeve shaft 64.

The transmission 14 includes two torque-transmitting mechanisms. A stationary-type clutch C1, also referred to as a brake, is selectively engagable to ground the ring gear 58 to the transmission casing 24. Rotating-type clutch C2 is selectively engagable to connect the sun gear 42 for common rotation with ring gear 58.

The transmission 14 is configured to minimize the number and size of shafts and shells used to interconnect the various transmission components. In the transmission 14, shafts include the input member 16, annular sleeve shaft 60 forming output member 26B concentric with the input member 16, and annular intermediate sleeve shafts 62, 64 concentric with input member 16 and shaft 60. Hub members 66 and 68 connect the carrier members 44, 54 for common rotation with the shaft 60, and with all of the alternate output members 26, 26A, 26B. Hub member 70 extends from input member 16 to connect the ring gear 48 for common rotation therewith, and includes a relatively short axially-extending portion 72. Hub member 74 extends from intermediate sleeve shaft 62 and is connectable with a relatively short axial-extending member 78 via engagement of clutch C2 to connect the sun gear 42, rotor 32A and intermediate sleeve shaft 62 for common rotation with the ring gear 58.

Transmission 14 is configured so that planetary gear set 40 is positioned axially between a radially-extending end wall (not shown) of the casing 24 and the motor/generator 20. The end wall is to the left of the planetary gear set 40 as the transmission 14 is illustrated in FIG. 1. Planetary gear set 50 is positioned axially between the motor/generators 20, 22. Clutch C1 is positioned radially outward and aligned with the ring gear 58 of planetary gear set 50. Clutch C2 is positioned axially between motor/generator 20 and planetary gear set 50 and is aligned with ring gear 58.

A first forward mode of operation is established by engaging clutch C1 and releasing clutch C2. This mode of operation is an input-split operating mode, with planetary gear set 40 operating in a differential mode and planetary gear set 50 operating in a torque multiplication mode, engine 12 providing torque and motor/generator 20 motoring in a forward direction. A reverse electrically variable operating mode is established with the same clutch engagement, but with the motor/generator 20 motoring in a reverse direction.

A second forward mode of operation is established by engaging clutch C2 and disengaging clutch C1. The shift between modes occurs when the speed of rotor 32A is zero, and the speed of ring gear 58 is also zero (due to engagement of clutch C1), so that the shift can occur without torque disturbance.

A fixed forward speed ratio is established by engaging both C1 and C2.

Second Embodiment

Figure 2:
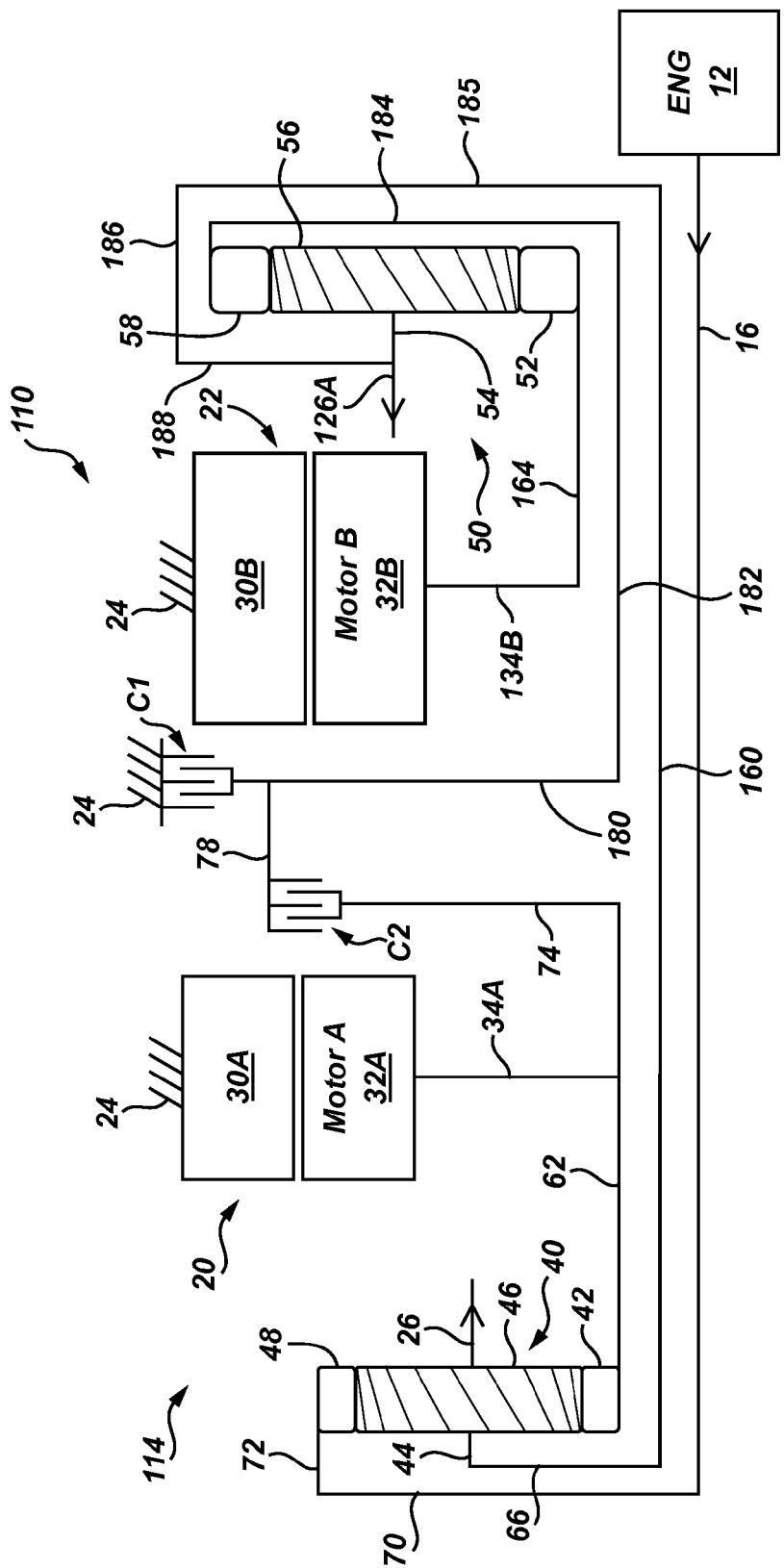
FIG. 2 is a schematic illustration of a second embodiment of a hybrid electric powertrain including a second embodiment of an electrically variable transmission.

Referring to FIG. 2, powertrain 110 includes an engine 12 and an electrically variable transmission 114 having many of the same components, referred to with the same reference numbers, that function in the same way as shown and described with respect to the transmission 14 and powertrain 10 of FIG. 1. Although not shown in FIG. 2, a battery 36, inverter 38, and controller 39 are connected with the stators 30A, 30B as shown and described in FIG. 1.

Transmission 114 is configured so that planetary gear set 40 is positioned axially between a radially-extending end wall (not shown) of the casing 24 and the motor/generator 20. Clutches C1 and C2 are positioned axially between the motor/generators 20, 22. Planetary gear set 50 is positioned axially between the motor/generator 22 and a radially-extending opposing end wall (not shown) of the casing 24. Hub member 134B and axially-extending member 164 connect the rotor 32B for common rotation with the sun gear 52. Transmission 114 requires additional hub members 180 and 184, connected with an additional intermediate sleeve shaft 182, in order to connect ring gear 58 with clutches C1 and C2. Annular sleeve shaft 160 does not form an output member, but is operatively connected via hub member 185 and 188 and axial-extending member 186 for rotation with an output member 126A extending from the carrier member 54 axially between the motor/generator 22 and the planetary gear set 50.

Third Embodiment

Figure 3:
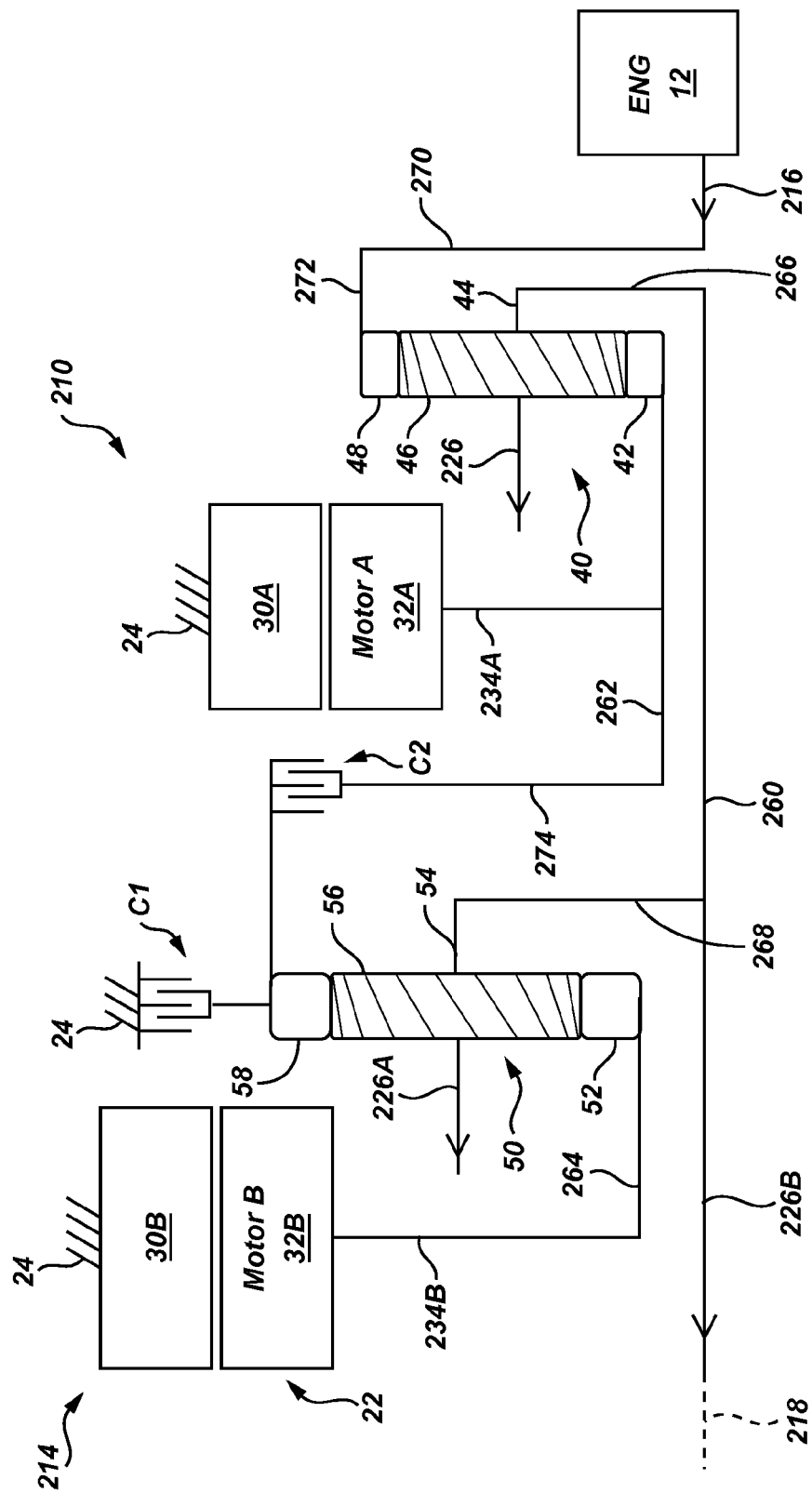
FIG. 3 is a schematic illustration of a third embodiment of a hybrid electric powertrain including a third embodiment of an electrically variable transmission.

Referring to FIG. 3, powertrain 210 includes an engine 12 and an electrically variable transmission 214 having many of the same components, referred to with the same reference numbers, that function in the same way as shown and described with respect to the transmission 14 and powertrain 10 of FIG. 1. Although not shown in FIG. 3, a battery 36, inverter 38, and controller 39 are connected with the stators 30A, 30B as shown and described in FIG. 1.

Transmission 214 is configured so that motor/generator 22 is positioned axially between a radially-extending end wall (not shown) of the casing 24 and the planetary gear set 50. Clutch C1 is positioned radially outward and aligned with the ring gear 58 of planetary gear set 50. Clutch C2 is positioned axially between motor/generator 20 and gear set 50 and may be aligned with ring gear 58. Motor/generator 20 is positioned axially between the clutch C2 and the planetary gear set 40. Planetary gear set 40 is positioned axially between the motor/generator 20 and an opposing radially-extending end wall (not shown) of the casing 24.

Transmission 214 has an input member 216 that is coaxial with shaft 260, which connects to output member 226B, establishing an axis of rotation 218. Input member 216 is not concentric with shaft 260, in that the input member 216 does not extend through the motor/generators 20, 22 and the planetary gear sets 40, 50. Hub member 270 and axially-extending portion 272 connect the input member 216 with ring gear 48. Intermediate sleeve shaft 262 connects hub member 274 and rotor hub 234A with sun gear 42. Intermediate sleeve shaft 264 connects rotor hub 234B for common rotation with sun gear 52. Hub members 266 and 268 connect the carrier members 44, 54 with the shaft 260. Alternate output members 226 and 226A extend from the respective carrier members 44, 54.

Fourth Embodiment

Figure 4:
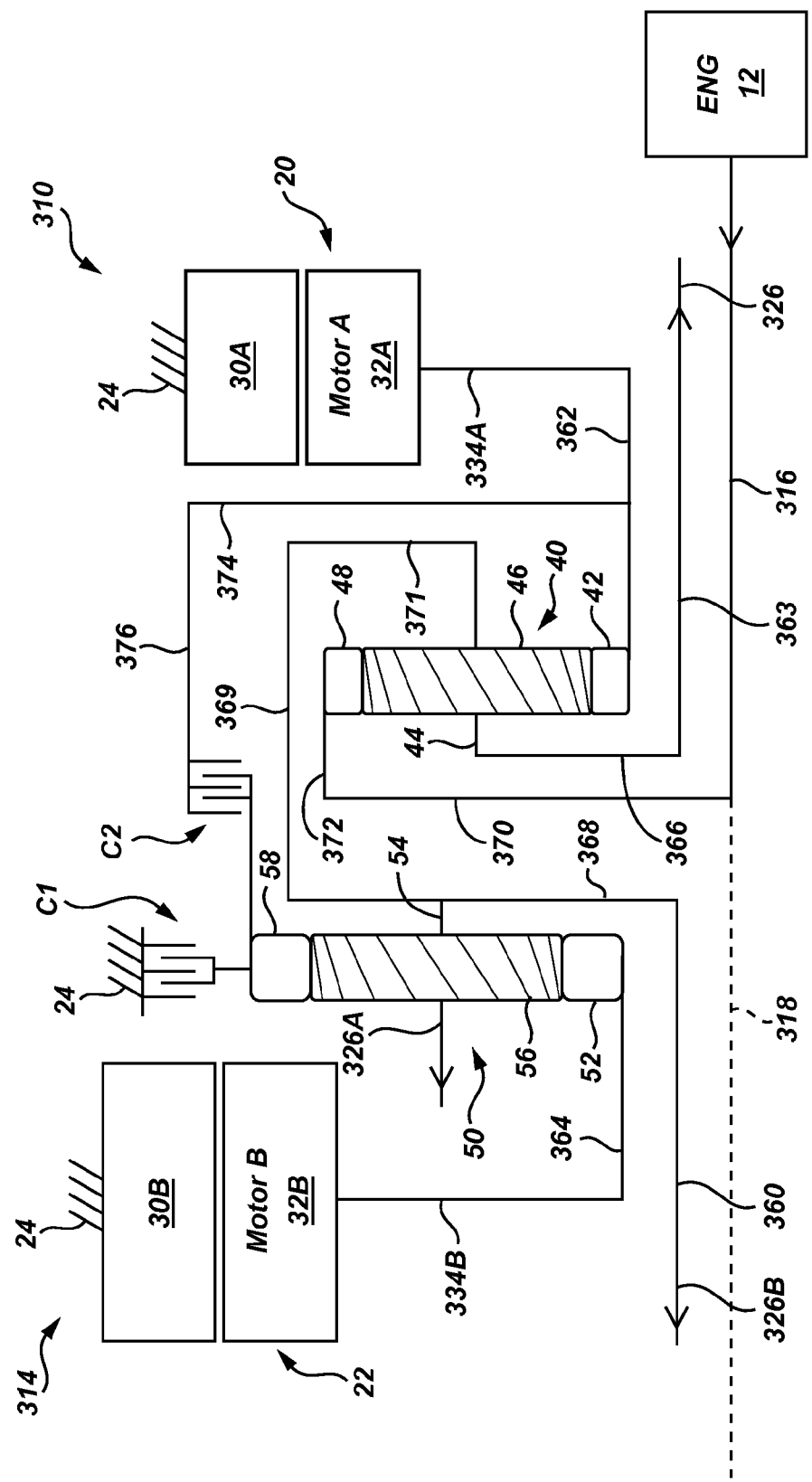
FIG. 4 is a schematic illustration of a fourth embodiment of a hybrid electric powertrain including a fourth embodiment of an electrically variable transmission.

Referring to FIG. 4, powertrain 310 includes an engine 12 and an electrically variable transmission 314 having many of the same components, referred to with the same reference numbers, that function in the same way as shown and described with respect to the transmission 14 and powertrain 10 of FIG. 1. Although not shown in FIG. 4, a battery 36, inverter 38, and controller 39 are connected with the stators 30A, 30B as shown and described in FIG. 1.

Transmission 314 is configured so that motor/generator 22 is positioned axially between a radially-extending end wall (not shown) of the casing 24 and the planetary gear set 50. Clutch C1 is positioned radially outward and aligned with the ring gear 58 of planetary gear set 50. Clutch C2 is positioned axially between motor/generator 20 planetary gear set 50. Planetary gear set 40 is positioned axially between the clutch C2 and the motor/generator 20. Motor/generator 20 is positioned axially between the planetary gear set 40 and an opposing radially-extending end wall (not shown) of the casing 24.

Transmission 314 has an input member 316 axially spaced from and not concentric with shaft 360, which connects to output member 326B. Shaft 360 is not shown as coaxial with input member 316 (but could be configured to be coaxial therewith), and shares a common axis of rotation 318 therewith. Input member 316 extends only through motor/generator 20 and planetary gear set 40. Hub member 370 and extending portion 372 connect the input member 316 with ring gear 48. Intermediate sleeve shaft 362 connects hub member 374 and axially-extending portion 376 thereof, and rotor hub 334A with sun gear 42. A separate sleeve shaft 363 concentric with input member 316 and sleeve shaft 362 connects carrier member 44 and hub member 366 to an output member 326 connected thereto. Sleeve shaft 364 connects rotor hub 334B with sun gear 52. Hub members 368 and 371 with axially-extending portion 369 connect the carrier members 44, 54 with the shaft 360. Alternate output member 326A extends from the carrier member 54.

Fifth Embodiment

Figure 5:
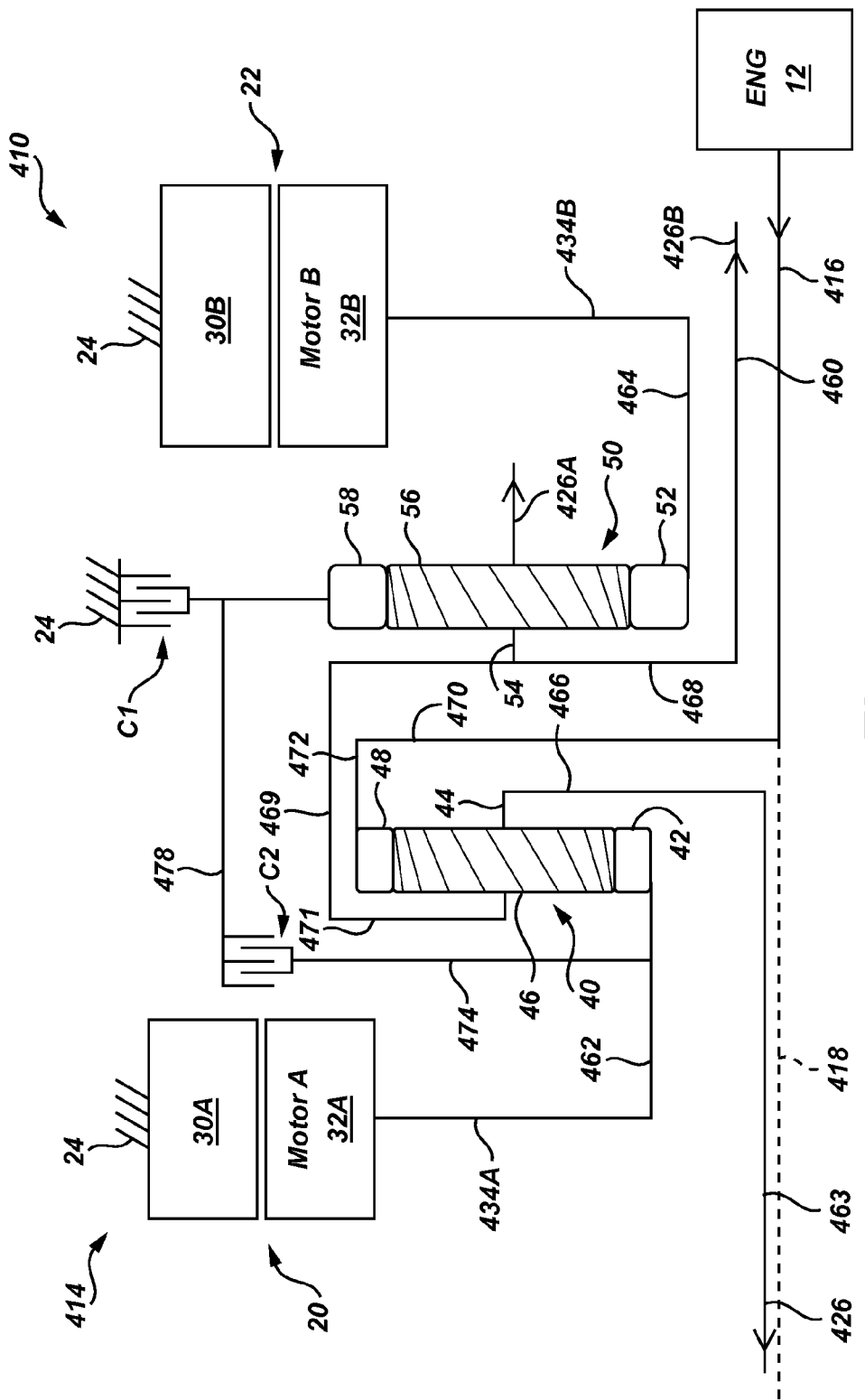
FIG. 5 is a schematic illustration of a fifth embodiment of a hybrid electric powertrain including a fifth embodiment of an electrically variable transmission.

Referring to FIG. 5, powertrain 410 includes an engine 12 and an electrically variable transmission 414 having many of the same components, referred to with the same reference numbers, that function in the same way as shown and described with respect to the transmission 14 and powertrain 10 of FIG. 1. Although not shown in FIG. 5, a battery 36, inverter 38, and controller 39 are connected with the stators 30A, 30B as shown and described in FIG. 1.

Transmission 414 is configured so that motor/generator 20 is positioned axially between a radially-extending end wall (not shown) of the casing 24 and the planetary gear set 40. Clutch C1 is positioned radially outward and aligned with the ring gear 58 of planetary gear set 50. Clutch C2 is positioned axially between motor/generator 20 and planetary gear set 40. Planetary gear set 50 is positioned axially between planetary gear set 40 and the motor/generator 22. Motor/generator 22 is positioned axially between the planetary gear set 50 and an opposing radially-extending end wall (not shown) of the casing 24.

Transmission 414 has an input member 416 axially spaced from and not concentric with shaft 463, which connects to output member 426. Shaft 463 is not shown as coaxial with input member 416 (but could be configured to be coaxial therewith), and shares a common axis of rotation 418 therewith. Input member 416 extends only through motor/generator 22 and planetary gear set 50. Hub member 470 and axial-extending portion 472 connect the input member 416 with ring gear 48. Intermediate sleeve shaft 462 connects hub member 474, and rotor hub 434A with sun gear 42. Hub member 474 is connected with clutch C2. A separate sleeve shaft 460 concentric with input member 416 and with sleeve shaft 464 connects carrier member 54 and hub member 468 to an output member 426B connected thereto. Sleeve shaft 464 connects rotor hub 434B with sun gear 52. Hub members 468 and 471 with axially-extending portion 469 connect the carrier members 44, 54 with the shaft 460. Hub member 466 connects carrier member 44 with shaft 463. Alternate output member 426A extends from the carrier member 54. Axially-extending member 478 connects clutch C2 with clutch C1 and ring gear 58, circumscribing the planetary gear set 40.

Sixth Embodiment

Figure 6:
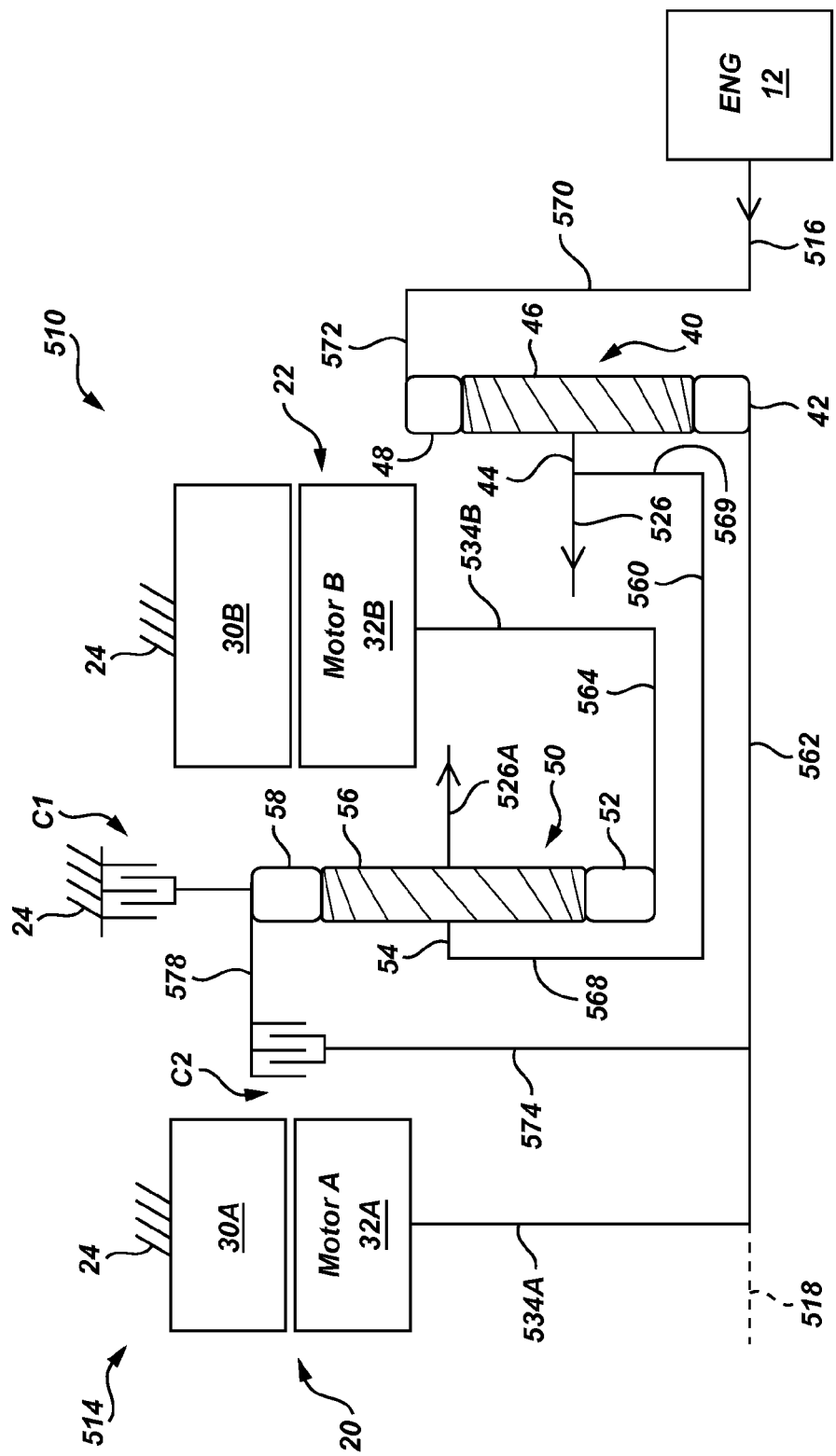
FIG. 6 is a schematic illustration of a sixth embodiment of a hybrid electric powertrain including a sixth embodiment of an electrically variable transmission.

Referring to FIG. 6, powertrain 510 includes an engine 12 and an electrically variable transmission 514 having many of the same components, referred to with the same reference numbers, that function in the same way as shown and described with respect to the transmission 14 and powertrain 10 of FIG. 1. Although not shown in FIG. 6, a battery 36, inverter 38, and controller 39 are connected with the stators 30A, 30B as shown and described in FIG. 1.

Transmission 514 is configured so that motor/generator 20 is positioned axially between a radially-extending end wall (not shown) of the casing 24 and the planetary gear set 50. Clutch C1 is positioned radially outward and aligned with the ring gear 58 of planetary gear set 50. Clutch C2 is positioned axially between motor/generator 20 and planetary gear set 50. Planetary gear set 50 is positioned axially between motor/generator 20 and the motor/generator 22. Motor/generator 22 is positioned axially between the planetary gear set 50 and planetary gear set 40. Planetary gear set 40 is positioned between motor/generator 22 and an opposing radially-extending end wall (not shown) of the casing 24.

Transmission 514 has an input member 516 axially spaced from and not concentric with shaft 560, which connects to alternative output members 526, 526A. Shaft 562 is coaxial with input member 516, and shares a common axis of rotation 518 therewith. Input member 516 connects via hub member 570 and extending portion 572 to connect the input member 516 for common rotation with ring gear 48. Shaft 562 connects hub member 574, and rotor hub 534A with sun gear 42. Hub member 574 is connected with clutch C2. A separate sleeve shaft 560 concentric with shaft 562 connects carrier member 54 and hub member 568 to hub member 569, carrier member 44 and an output member 526 connected thereto. Sleeve shaft 564 connects rotor hub 534B with sun gear 52. Alternate output member 526A extends from the carrier member 54. Axially-extending member 578 connects clutch C2 with clutch C1 and ring gear 58, circumscribing the planetary gear set 50.

Seventh Embodiment

Figure 7:
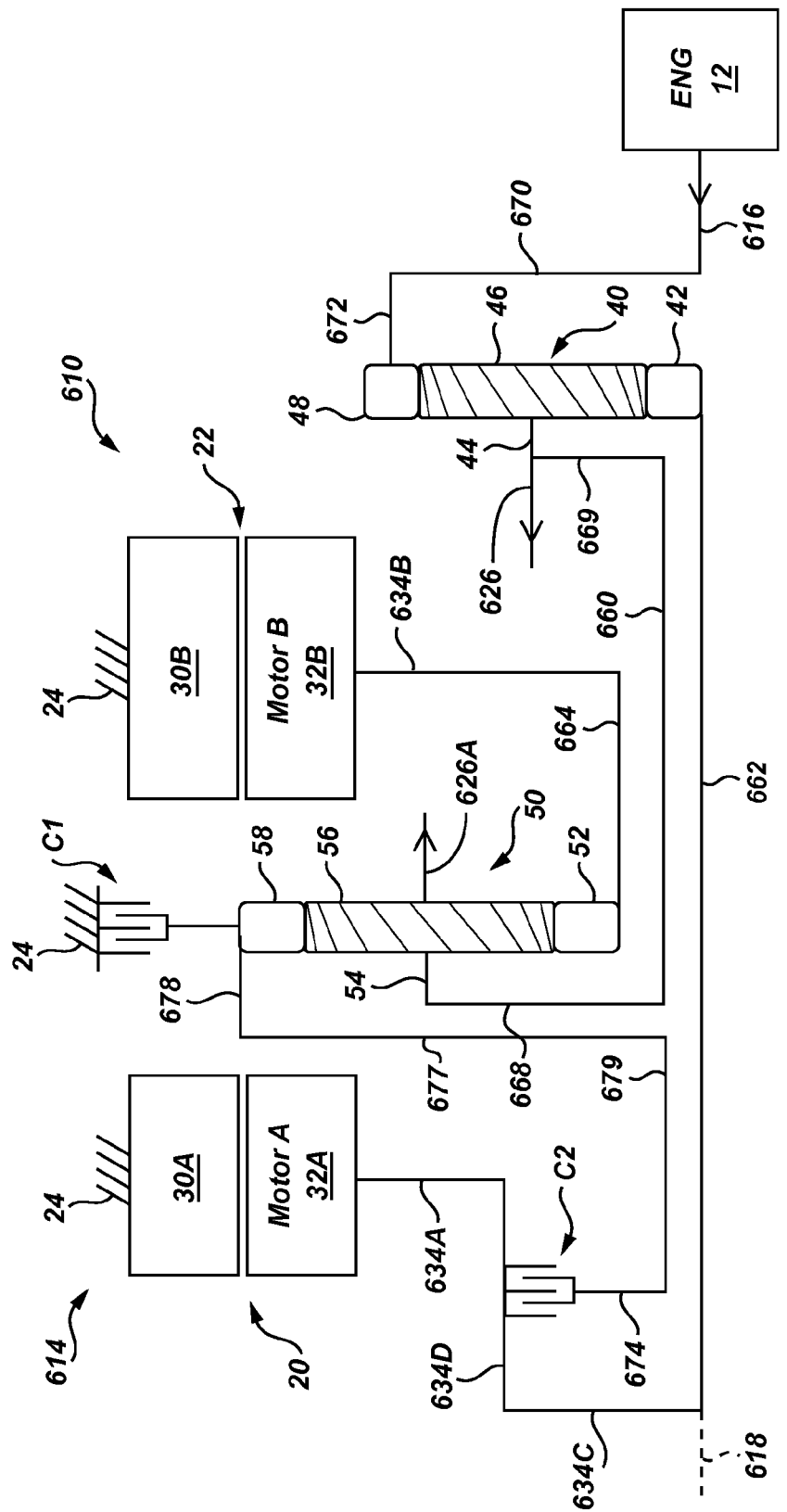
FIG. 7 is a schematic illustration of a seventh embodiment of a hybrid electric powertrain including a seventh embodiment of an electrically variable transmission.

Referring to FIG. 7, powertrain 610 includes an engine 12 and an electrically variable transmission 614 having many of the same components, referred to with the same reference numbers, that function in the same way as shown and described with respect to the transmission 14 and powertrain 10 of FIG. 1. Although not shown in FIG. 7, a battery 36, inverter 38, and controller 39 are connected with the stators 30A, 30B as shown and described in FIG. 1.

Transmission 614 is configured so that motor/generator 20 is positioned axially between a radially-extending end wall (not shown) of the casing 24 and the planetary gear set 50. Clutch C1 is positioned radially outward and aligned with the ring gear 58 of planetary gear set 50. Clutch C2 is positioned radially inward of motor/generator 20, and axially between the end wall and motor/generator 20. Planetary gear set 50 is positioned axially between motor/generator 20 and the motor/generator 22. Motor/generator 22 is positioned axially between the planetary gear set 50 and planetary gear set 40. Planetary gear set 40 is positioned between motor/generator 22 and an opposing radially-extending end wall (not shown) of the casing 24.

Transmission 614 has an input member 616 axially spaced from and not concentric with shaft 660, which connects to alternative output members 626, 626A. Shaft 662 is coaxial with input member 616, and shares a common axis of rotation 618 therewith. Input member 616 connects to hub member 670 and axially-extending portion 672 to connect the input member 616 for common rotation with ring gear 48. Shaft 662 connects rotor hub 634A with sun gear 42 via a hub member 634C and an axially-extending portion 634D. The clutch C2 is nested between the axially-extending portion 634D, the hub 634C and the shaft 662. Hub member 674 is connected with clutch C2. A separate sleeve shaft 660 concentric with shaft 662 connects carrier member 54 and hub members 668 and 669 to carrier member 44 and an output member 626 connected thereto. Sleeve shaft 664 connects rotor hub 634B with sun gear 52. Alternate output member 626A extends from the carrier member 54. Axially-extending member 678, hub 677 and axial-extending member 679, which is an annular shaft, connect clutch C2 with clutch C1 and ring gear 58. Axial-extending member 678 circumscribes the planetary gear set 50.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission for a vehicle, comprising:
an input member;
an output member;
a stationary member;

a first and a second planetary gear set, each having a sun gear, a carrier member, and a ring gear; wherein the carrier member of the first planetary gear set is continuously connected with the carrier member of the second planetary gear set and with the output member so that the carrier member of the first planetary gear set rotates together with and at the same speed as the carrier member of the second planetary gear set and the output member;

a first and a second motor/generator, each having a rotor and a stator; wherein the rotor of the first motor/generator is continuously connected with the sun gear of the first planetary gear set so that the rotor of the first motor/generator rotates together with and at the same speed as the sun gear of the first planetary gear set and the rotor of the second motor/generator is continuously connected with the sun gear of the second planetary gear set so that the rotor of the second motor/generator rotates together with and at the same speed as the sun gear of the second planetary gear set;

a first torque-transmitting mechanism selectively engagable to ground the ring gear of the second planetary gear set to the stationary member; and a second torque-transmitting mechanism selectively engagable to connect the sun gear of the first planetary gear set with the ring gear of the second planetary gear set so that the sun gear of the first planetary gear set rotates together with and at the same speed as the ring gear of the second planetary gear set; wherein the transmission is configured with the input member surrounded by at least one of the planetary gear sets, with the first torque-transmitting mechanism radially outward of and aligned with the second planetary gear set, or with the output member extending radially from one of the planetary gear sets.

2. The electrically-variable transmission of claim 1, wherein the respective rotors of the first and second motor/generators are connected for rotation with the respective sun gears via respective radially-extending first and second rotor hubs and first and second annular intermediate shafts concentric with the input member;
wherein the carrier members are connected for common rotation with one another via an annular sleeve shaft concentric with the annular intermediate shafts, and via first and second radially-extending hub members, respectively;
wherein a third hub member extends radially from the input member and connects the input member for common rotation with the ring gear of the first planetary gear set; and
wherein a fourth hub member extends radially from the first annular intermediate shaft and is connectable for common rotation with the ring gear of the second planetary gear set via the second torque-transmitting mechanism.

3. The electrically-variable transmission of claim 2, wherein the first motor/generator is positioned axially between the first and the second planetary gear sets; wherein the second planetary gear set is located axially between the first and the second motor/generators; wherein the first torque-transmitting mechanism is located radially outward of the second planetary gear set; and wherein the second torque-transmitting mechanism is located axially between the first motor/generator and the second planetary gear set.

4. The electrically-variable transmission of claim 2, wherein a fifth and a sixth radially-extending hub member extend from a third annular intermediate shaft and are selectively connectable with the first annular intermediate shaft and the fourth radially-extending hub member via the second torque-transmitting mechanism.

5. The electrically-variable transmission of claim 4, wherein the first motor generator is located axially between the first planetary gear set and the second motor/generator; wherein the second motor/generator is located axially between the first motor/generator and the second planetary gear set; and wherein the first and second torque-transmitting mechanisms are located axially between the first motor/generator and the second motor/generator.

6. The electrically-variable transmission of claim 5, wherein the respective rotors of the first and second motor/generators are connected for rotation with the respective sun gears via respective radially-extending first and second rotor hubs and first and second annular intermediate shafts not concentric with the input member;
wherein the carrier members are connected for common rotation via a shaft concentric with and positioned radially inward of the first annular intermediate shaft, and via first and second radially extending hub members, respectively;
wherein a third radially-extending hub member extends radially from the input member to connect the input member with the ring gear of the first planetary gear set; and
wherein a fourth hub member extends radially from the first annular intermediate shaft and is connectable with the ring gear of the second planetary gear set via the second torque-transmitting mechanism.

7. The electrically-variable transmission of claim 6, wherein the first planetary gear set is located axially between the first and the second motor/generator; wherein the first motor/generator is located axially between the first planetary gear set and the second planetary gear set; and wherein the first and second torque-transmitting mechanisms are located axially between the first motor/generator and the second motor/generator.

8. The electrically-variable transmission of claim 1, wherein the respective rotors of the first and second motor/generators are connected for rotation with the respective sun gears via respective radially-extending first and second rotor hubs and first and second annular intermediate shafts;
wherein the carrier members are connected for common rotation via an axially-extending annular member positioned radially outward of the first planetary gear set and first and second radially-extending hub members extending from the axially-extending annular member;
wherein a third hub member extends radially from the input member to connect the input member for common rotation with the ring gear of the first planetary gear set; and
wherein a fourth hub member extends radially from the first annular intermediate shaft and is connectable for common rotation with the ring gear of the second planetary gear set via the second torque-transmitting mechanism.

9. The electrically-variable transmission of claim 8, wherein the second planetary gear set is located axially between the second motor/generator and the first planetary gear set; wherein the first planetary gear set is located axially between the second planetary gear set and the first motor/generator; and wherein at least one of the first and second torque-transmitting mechanisms is located radially-outward of the first and second planetary gear sets.

10. The electrically-variable transmission of claim 8, wherein the first planetary gear set is located axially between the first motor/generator and the second planetary gear set; wherein the second planetary gear set is located axially between the first planetary gear set and the second motor/generator; and wherein at least one of the first and second torque-transmitting mechanisms is located radially-outward of the first and second planetary gear sets.

11. The transmission of claim 1, wherein the rotor of the first motor/generator is connected for rotation with the sun gear of the first planetary gear set via a radially-extending first rotor hub and a first intermediate shaft; wherein the rotor of the second motor/generator is connected for rotation with the sun gear of the second planetary gear set via an annular second intermediate shaft concentric with the first intermediate shaft;
wherein the carrier members are connected for common rotation via an annular sleeve shaft concentric with and positioned radially between the intermediate shafts, and via first and second radially-extending hub members;
wherein a third hub member extends radially from the input member to connect the input member with the ring gear of the first planetary gear set; and
wherein a fourth hub member extends radially from the first intermediate shaft and is connected for common rotation with the ring gear of the second planetary gear set via the second torque-transmitting mechanism.

12. The electrically-variable transmission of claim 11, wherein the second planetary gear set is located axially between the first motor/generator and the second motor/generator; wherein the second motor/generator is located axially between the first planetary gear set and the second planetary gear set; and wherein at least one of the first and second torque-transmitting mechanisms is located radially-outward of the first and second planetary gear sets.

13. The electrically-variable transmission of claim 1, wherein the rotor of the first motor/generator is connected for rotation with the sun gear of the first planetary gear set via a radially-extending first rotor hub and a first intermediate shaft; wherein the rotor of the second motor/generator is connected for rotation with the sun gear of the second planetary gear set via an annular second intermediate shaft concentric with the first intermediate shaft;
wherein the carrier members are connected for common rotation via an annular sleeve shaft concentric with and positioned radially between the intermediate shafts, and via first and second radially extending hub members;
wherein a third hub member extends radially from the input member to connect the input member with the ring gear of the first planetary gear set; and
wherein a fourth hub member extends radially from the ring gear of the second planetary gear set and is connectable for common rotation with the sun gear of the first planetary gear set via engagement of the second torque-transmitting mechanism.

14. The electrically-variable transmission of claim 13, wherein the first torque-transmitting mechanism is positioned radially outward of the second planetary gear set; and wherein the second torque-transmitting mechanism is positioned radially inward of the first rotor hub.

15. The electrically-variable transmission of claim 13, wherein the second planetary gear set is located axially between the first motor/generator and the second motor/generator; wherein the second motor/generator is located axially between the first planetary gear set and the second planetary gear set; and wherein the first torque-transmitting mechanism is located radially outward of the second planetary gear set and the second torque-transmitting mechanism is located radially inward of the first motor/generator.

16. The electrically-variable transmission of claim 1, further comprising:
an alternate output member continuously connected for common rotation with the carrier member of the second planetary gear set.

17. The electrically-variable transmission of claim 16, wherein the first output member and the alternate output member extend axially toward the second motor/generator.

18. The electrically-variable transmission of claim 1, wherein the rotor of the first motor/generator is continuously connected for common rotation with the sun gear of the first planetary gear set by a shaft; and wherein the input member is coaxial with but not concentric with the shaft.

* * * * *